United States Patent [19]

Tristano et al.

[11] Patent Number: 5,080,202

[45] Date of Patent: Jan. 14, 1992

[54] WHEEL CYLINDER

[75] Inventors: Nicola Tristano, Matera; Angelantonio Errico, Giovinazzo, both of Italy

[73] Assignee: Bendix Altecna S.p.A., Modugno, Italy

[21] Appl. No.: 525,529

[22] Filed: May 18, 1990

[51] Int. Cl.$^5$ .............................................. F16D 51/02
[52] U.S. Cl. ................................ 188/71.8; 188/79.61; 188/79.62; 188/196 P; 188/364
[58] Field of Search ................ 188/71.8, 79.51, 364, 188/196 P, 79.52, 79.62

[56] References Cited

U.S. PATENT DOCUMENTS

| | | | |
|---|---|---|---|
| 1,755,830 | 4/1930 | Loughead | 188/364 |
| 1,896,902 | 2/1933 | Kohr | 188/336 |
| 2,417,476 | 3/1947 | Finley | 188/364 X |
| 2,445,061 | 7/1948 | Goeffrich | 188/364 |
| 2,497,815 | 2/1950 | Frick | 188/364 X |
| 2,723,016 | 11/1955 | Goldberg | 188/336 X |
| 3,338,352 | 8/1967 | Guilhamat | 188/79.62 X |
| 3,467,226 | 9/1969 | Belart | 188/79.62 X |

FOREIGN PATENT DOCUMENTS

| | | | |
|---|---|---|---|
| 2026632 | 2/1980 | United Kingdom | 188/71.8 |
| 2110328 | 6/1983 | United Kingdom | |

*Primary Examiner*—Robert J. Oberleitner
*Assistant Examiner*—Peter M. Poon
*Attorney, Agent, or Firm*—Larry J. Palguta; Ken C. Decker

[57] ABSTRACT

The invention relates to a wheel cylinder for a drum brake, comprising a body (2) provided with a longitudinal bore, two pistons (4,6) sliding in opposite directions outwards in the bore under the action of a pressurized fluid introduced between the pistons against the return springs of the shoes of the brake, and a mechanism limiting the return travel of the pistons when the pressure is released. According to the invention, the mechanism limiting the travel consists of two resilient rings (16, 18), at the outer periphery of each of which a friction mechanism (20, 22) is disposed, and which are disposed, respectively, in an annular groove (24, 26) made in each of the pistons so as to provide a specific axial clearance (d) between a radial wall of the groove and the adjacent side of an assembly consisting of the resilient ring and the friction mechanism, this assembly being provided in order to resist the return springs of the brake shoes in a drum brake. The resilient rings (16, 18) are in the form of an open retainer ring with variable thickness about its perimeter so as to effect a substantially uniform pressure over its outer periphery against the inner surface of the cylinder.

6 Claims, 1 Drawing Sheet

WHEEL CYLINDER

The present invention relates to a wheel cylinder for a drum brake, intended to separate the shoes carrying the friction linings against a rotating drum.

Drum brakes and the wheel cylinders fitted to them are well known to a person skilled in the art.

A wheel cylinder generally comprises a body provided with a longitudinal bore in which two pistons slide in opposite directions outwards under the action of a pressurized fluid introduced between the pistons, so as to separate the brake shoes and obtain a braking of the drum. When the pressure of the fluid is released, the return springs of the shoes bring the latter back into a rest position. In so doing, the shoes which bear on the opposite ends of the two pistons also bring the latter back into a rest position. However, in order to avoid a significant travel of the pistons, which would occur when the shoes begin to wear, the cylinder comprises a means limiting the return travel of the pistons.

Such a means generally consists of a screw-nut system disposed between the two pistons and forming an adjustable spacer between them, as described in the document GB-A-2,110,328. The wheel cylinder according to this document also comprises a friction element of the tensioned open retainer ring type which is disposed in a groove of one of the pistons, this retainer ring exerting a pressure on the wall of the bore and having, on either side thereof in the groove, a Belleville-type washer which facilitates the return of the piston to a rest position.

This results in a costly wheel cylinder which is awkward to assemble.

The object of the present invention is to remedy these disadvantages and to construct an economical and reliable wheel cylinder.

According to the invention, the means limiting the return travel of the pistons when the pressure is released consists of two resilient rings, at the outer periphery of each of which a friction means is disposed. These rings are disposed, respectively, in an annular groove made in each of the pistons so as to provide a specific axial clearance between a radial wall of the groove and the adjacent side of the assembly consisting of the ring and the means of friction of one on the other.

The resilient ring is preferably a tensioned retainer ring.

The friction means may consist either of a continuous open ring or of a plurality of friction elements fixed to the resilient ring.

The invention will be better understood and other objects, advantages and features thereof will become more clearly apparent on reading the following description of preferred embodiments to which a plate of drawings is attached, in which.

Figure 1:
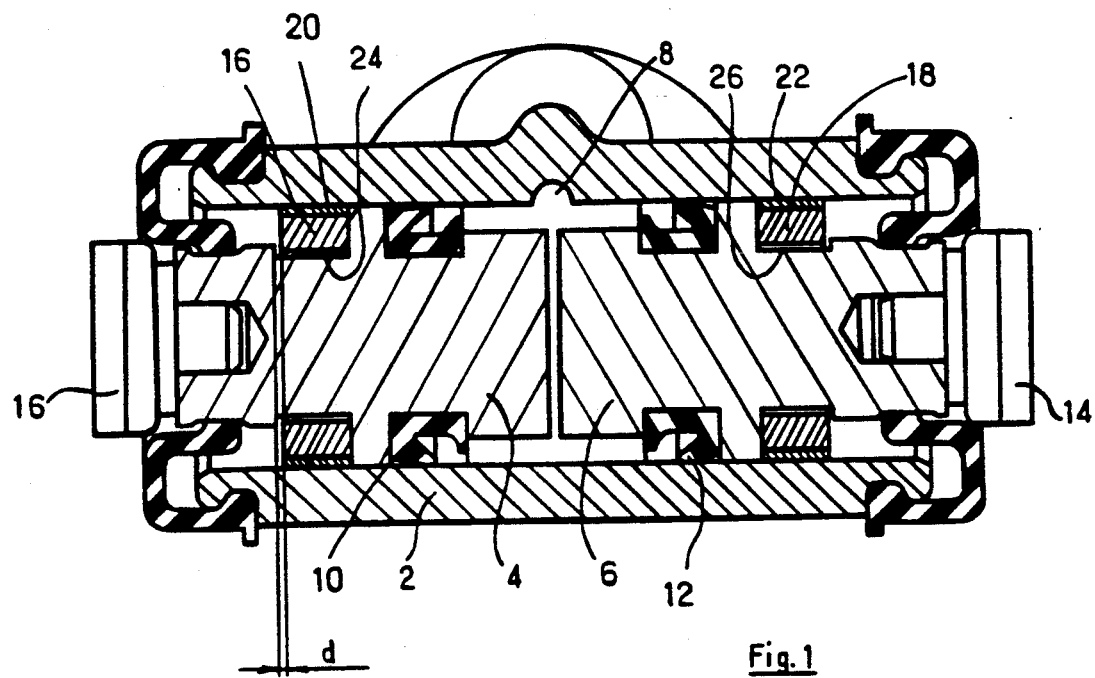
FIG. 1 shows diagrammatically in section a wheel cylinder according to the present invention.

With reference, now, to the figures and, more particularly, to FIG. 1, a wheel cylinder generally comprises a body 2 having a longitudinal bore in which two pistons 4 and 6 slide in opposite directions under the action of a pressurized fluid introduced via an orifice 8 made between the two pistons. Two collars 10, 12 ensure the seal of the cylinder. The shoes of the drum brake bear on the opposite ends 14, 16 of the two pistons. Since the operation of wheel cylinders is well known to a person skilled in the art, it will not be described in detail here.

According to the invention, the means limiting the return travel of the pistons when the brake pedal is released consists of two resilient rings 16, 18, at the outer periphery of each of which a friction means 20, 22 is fixed. The resilient rings 16, 18, provided with their friction means 20, 22, are disposed, respectively, in an annular groove 24, 26 made in each of the pistons 4, 6. The width of these grooves is such that there is a specific axial clearance d between a radial wall of the groove 24, 26 and the adjacent side of the assembly consisting of the resilient ring 16, 18 provided with the friction means 20, 22. This axial clearance d is such that it permits the travel of the piston during braking under normal conditions without entraining the abovementioned assembly, that it to say that it corresponds to the normal distance between the friction lining fitted to the brake shoe and the drum, a distance to which the usual resilient deformations are added. If the actual travel of the lining must be greater than this axial clearance d, for example due to wear of the friction lining or heating-up of the drum, the piston is entrained under the action of the pressure of the fluid in the central chamber until braking takes place.

The resilient rings 16, 18 provided with their friction means 20, 22 are then entrained in a manner corresponding approximately to the clearance.

During the phase of releasing the brake pedal, the pistons then return only over the clearance d, the resilient ring/friction means assembly being provided in order to withstand the force exerted by the return spring of the shoes.

The wheel cylinder thus obtained is therefore remarkably simple and reliable under all conditions of use.

In particular, a wheel cylinder according to the invention does not cause locking of the wheels following excessive heating-up of the brake, heating-up generally due to specific conditions of use of the vehicle, particularly in a mountainous environment.

In fact, the retraction forces created by the cooling of the drum are added to the force exerted by the return spring of the shoes and the pistons with the resilient rings provided with their friction means return, correspondingly, into the bore of the cylinder body, thus avoiding any wheel locking.

Figure 2:
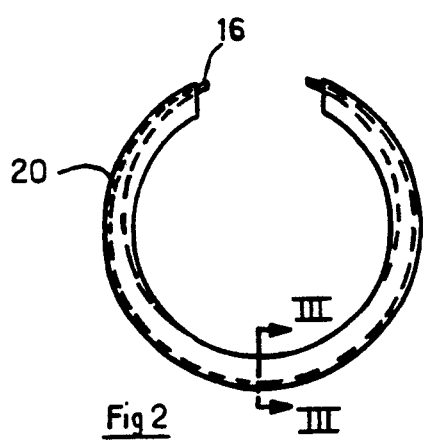
FIG. 2 shows the resilient ring and the friction means according to a first embodiment of the invention.
Figure 4:
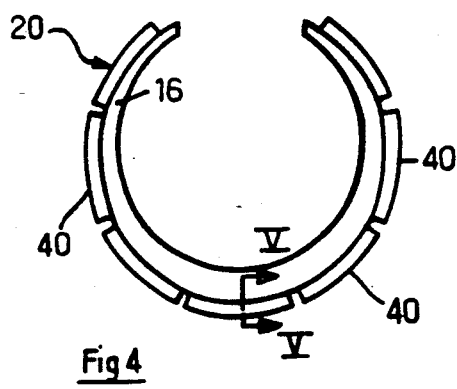
FIG. 4 shows the resilient ring and the friction means according to a second embodiment of the invention.

The resilient rings 16, 18 are preferably steel retainer rings, each consisting, for example, of an open ring which has a variable thickness, as shown in FIGS. 2 and 4, and determines a uniform pressure over its outer periphery.

Figure 3:
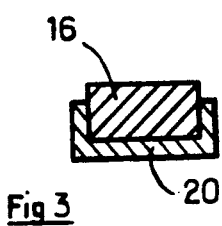
FIG. 3 is a view in section along the line III—III in FIG. 2.

According to a first embodiment illustrated in FIGS. 2 and 3, the friction means 20 consists of a continuous open ring. In order to facilitate serial production, this ring has a longitudinal section in the form of a U, in the hollow of which the resilient ring 16 is housed. It is, for example, a sheet of brass which has been suitably shaped and freely coupled to the resilient ring 16.

Figure 5:
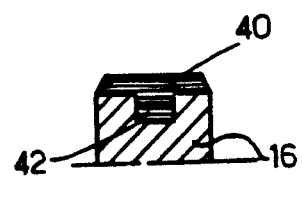
FIG. 5 is a view in section along the line V—V in FIG. 4.

According to another embodiment shown in FIG. 4, the friction means 20 consists of a plurality of friction elements 40 fixed discontinuously to the outer periphery of the resilient ring 16. Such a fixing may be obtained by means of simple adhesive bonding or, rather, as shown in FIG. 5, by anchoring by means of a stub 42 provided either on each element 40 or of stubs on the ring 16, penetrating, respectively, into corresponding orifices made either in the periphery of the ring 16 or in each element 40. These elements are preferably made from a sintered material having a hardness which is such that they do not cause consequent wear of the bore of the wheel cylinder and also having as constant as possible a friction coefficient, in particular despite the changes in temperature of the cylinder.

According to one embodiment, friction elements were made from a material marketed under the brand name Ferodo and the reference 3701F. They had a thickness of approximately 1.2 mm. Seven elements were fixed to each resilient ring.

Although only preferred embodiments of the invention have been described and shown, it is obvious that several modifications can be made by a person skilled in the art without departing from the scope of the present invention as defined by the attached claims.

We claim:

1. A wheel cylinder for a drum brake, said cylinder comprising a body provided with a longitudinal bore, two pistons sliding outwardly in opposite directions in said bore under the action of pressure from a pressurized fluid introduced between said pistons and against the force of at least one return spring of shoes of said brake, and means limiting return travel of said pistons when said pressure is released, said means limiting the return travel consisting of two assemblies each of which comprises a resilient ring having friction means disposed at an outer periphery thereof, and each assembly being disposed, respectively, in an annular groove located in the respective pistons so as to provide a specific axial clearance between a radial wall of the respective annular groove and an adjacent side of the respective assembly, wherein each resilient ring is an open retainer ring of variable thickness about its perimeter so as to effect a substantially uniform pressure over its outer periphery against the inner surface of said cylinder and each respective friction means has a substantially constant coefficient of friction, said assemblies being provided in order to resist said return spring and to yield under retraction forces created by the drum brake.

2. The wheel cylinder according to claim 1, wherein each friction means consists of an open ring disposed continuously at the outer periphery of the respective resilient ring.

3. The wheel cylinder according to claim 2, wherein each open ring has a cross section in the form of a U, in a hollow of which the resilient ring is housed.

4. The wheel cylinder according to claim 1, wherein each friction means consists of a plurality of friction elements fixed discontinuously to the outer periphery of the respective resilient ring.

5. The wheel cylinder according to claim 4, wherein said elements are fixed by means of adhesive bonding.

6. The wheel cylinder according to claim 4, wherein said elements are fixed for anchoring by means of at least one stub provided on one of each of said elements and at the outer periphery of the respective resilient ring and penetrating into a corresponding orifice made in one of the outer periphery of the respective resilient ring and in each of said elements.

* * * * *